(12) United States Patent
Doherty

(10) Patent No.: US 10,708,085 B2
(45) Date of Patent: Jul. 7, 2020

(54) CLOUD NETWORK SERVICES PROVIDER HAVING A GATEWAY FOR SUBSCRIBER SPECIFIED CONNECTION TO A CLOUD SERVICE PROVIDER

(71) Applicant: CLOUD CONDUCTOR, LLC, Boca Raton, FL (US)

(72) Inventor: Jamie Doherty, Boca Raton, FL (US)

( * ) Notice: Subject to any disclaimer, the term of this patent is extended or adjusted under 35 U.S.C. 154(b) by 173 days.

(21) Appl. No.: 15/576,131

(22) PCT Filed: Feb. 22, 2016

(86) PCT No.: PCT/US2016/018982
§ 371 (c)(1),
(2) Date: Nov. 21, 2017

(87) PCT Pub. No.: WO2016/200445
PCT Pub. Date: Dec. 15, 2016

(65) Prior Publication Data
US 2018/0139075 A1    May 17, 2018

Related U.S. Application Data

(60) Provisional application No. 62/230,424, filed on Jun. 6, 2015.

(51) Int. Cl.
*H04L 12/66* (2006.01)
*H04L 12/46* (2006.01)
(Continued)

(52) U.S. Cl.
CPC .......... *H04L 12/66* (2013.01); *H04L 12/4625* (2013.01); *H04L 12/4641* (2013.01);
(Continued)

(58) Field of Classification Search
CPC . H04L 12/66; H04L 12/4625; H04L 12/4641; H04L 61/20; H04L 67/18; H04L 67/306; H04L 2012/4629
See application file for complete search history.

(56) References Cited

U.S. PATENT DOCUMENTS

| | | | |
|---|---|---|---|
| 2012/0233668 A1 | 9/2012 | Leafe et al. | |
| 2015/0067171 A1* | 3/2015 | Yum | G06F 9/5072 709/226 |
| 2015/0067819 A1 | 3/2015 | Shribman et al. | |

* cited by examiner

*Primary Examiner* — Chris Parry
*Assistant Examiner* — Albert Chiou
(74) *Attorney, Agent, or Firm* — Williams Intellectual Property; Benjamin F. Williams

(57) ABSTRACT

A system for connection of a subscriber to a cloud service provider through a Gateway, having a proprietary routing and switching system for abstraction, modification and reassembly of a subscriber communication message (also "Data Packet"), for transmission to a subscriber specified Cloud Service Provider. This process of abstraction, modification and reassembly of the communication message, effects subscriber specified changes of (a) the routing address of the subscriber Network Address and (b) subscriber VLAN assignment of the VLAN Layer, to translate or adapt said communication message to comport with a VLAN assignment to a subscriber specified Cloud Service Provider, preliminary to transmission to a specified Cloud Service Provider. This modification and reassembly of the communication message enables subscriber connection to a cloud service provider of his own choosing, and without regard to and independent of the infrastructure preferences of the subscriber specified communication services provider (ISP).

8 Claims, 10 Drawing Sheets

(51) Int. Cl.
*H04L 29/08* (2006.01)
*H04L 29/12* (2006.01)
(52) U.S. Cl.
CPC .............. *H04L 61/20* (2013.01); *H04L 67/18* (2013.01); *H04L 67/306* (2013.01); *H04L 2012/4629* (2013.01)

Cloud to Subscriber

Abstraction Process

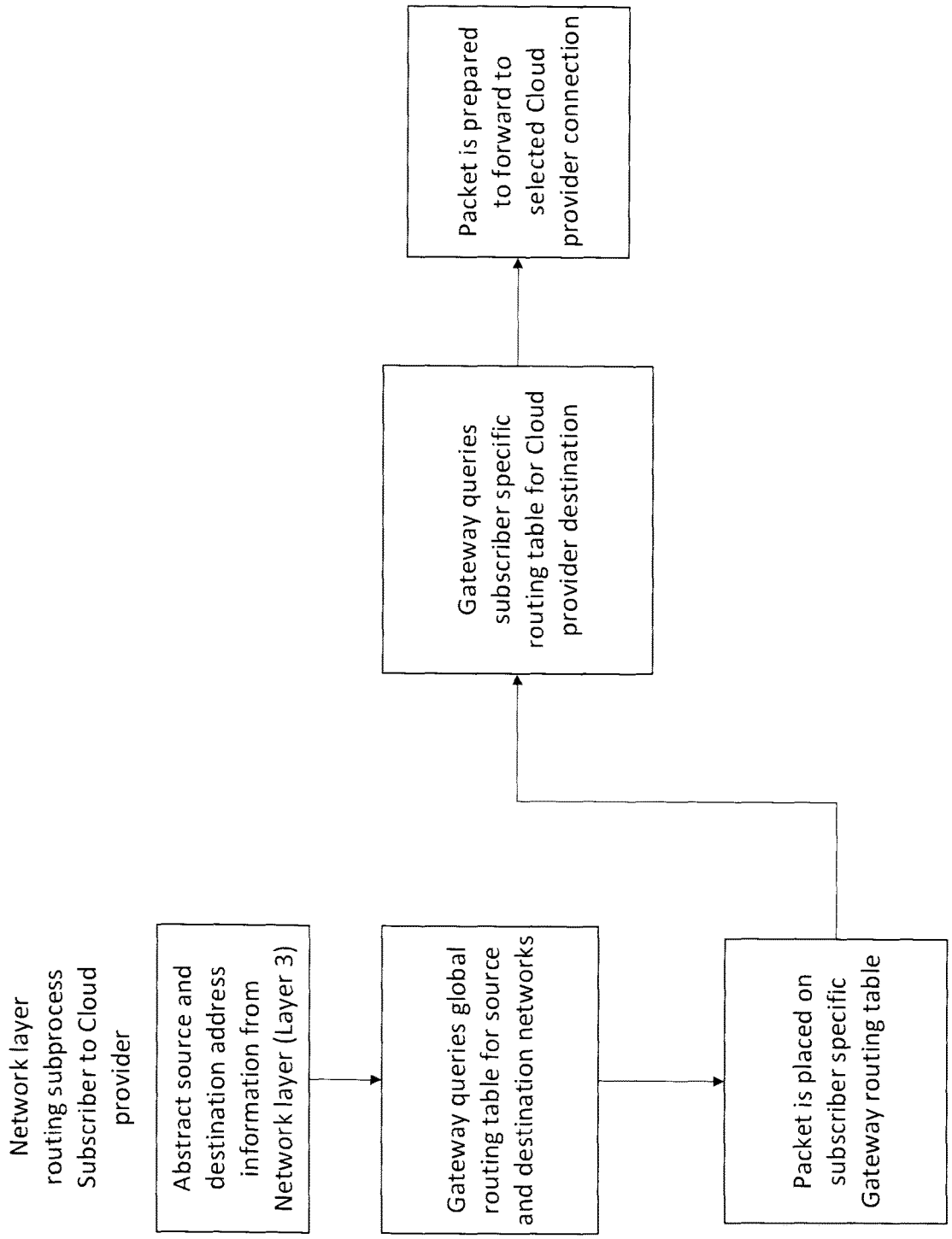

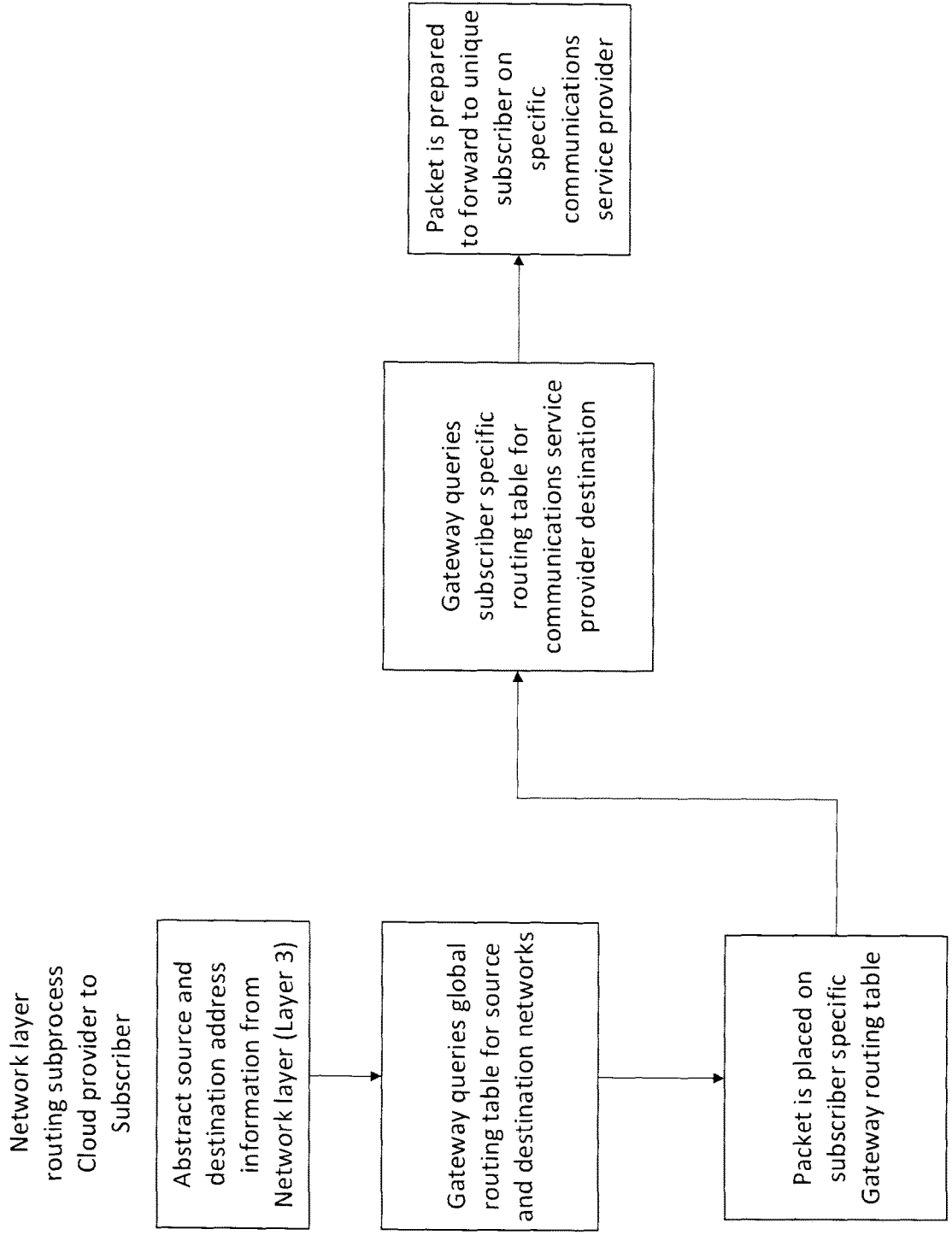

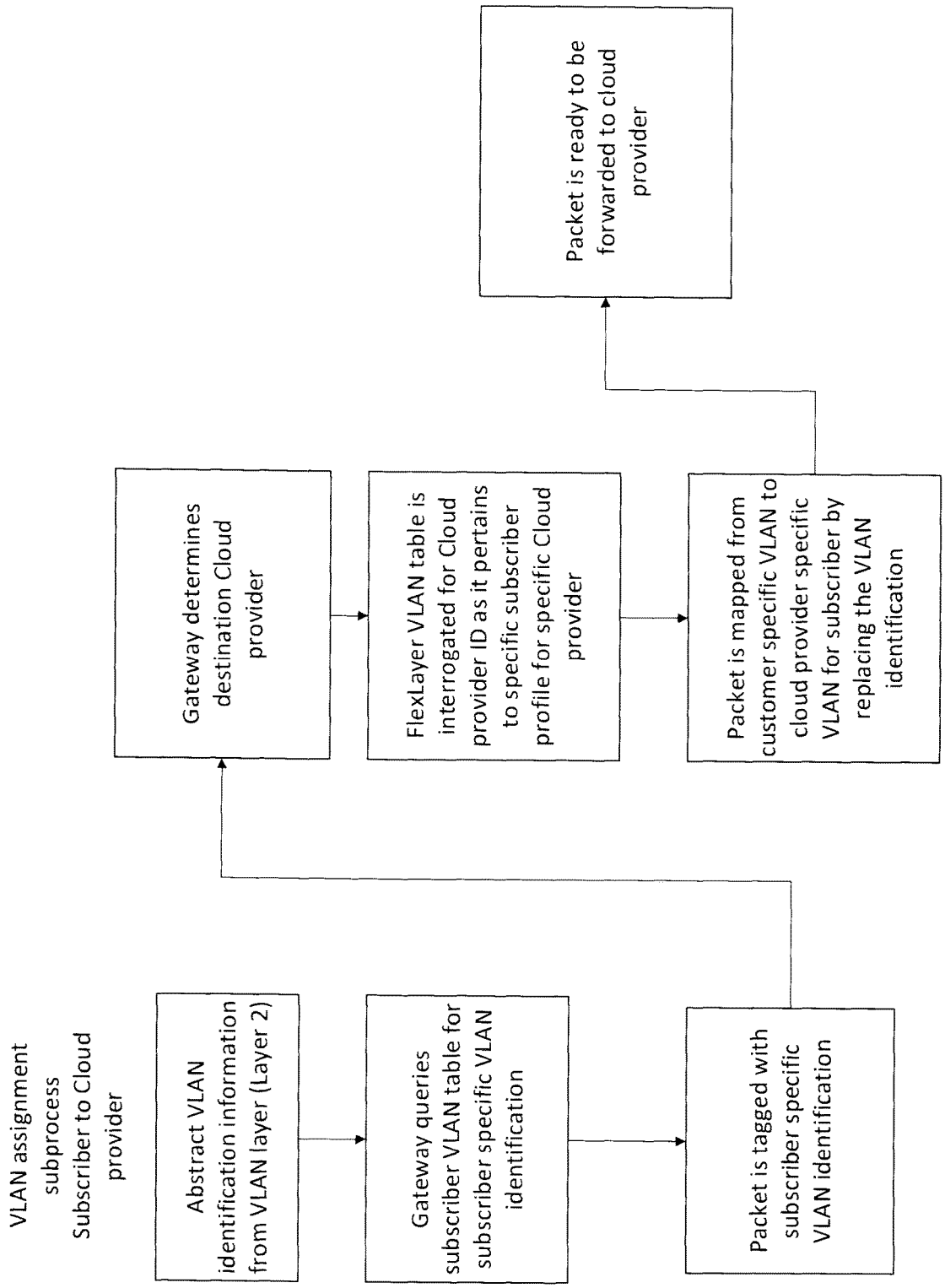

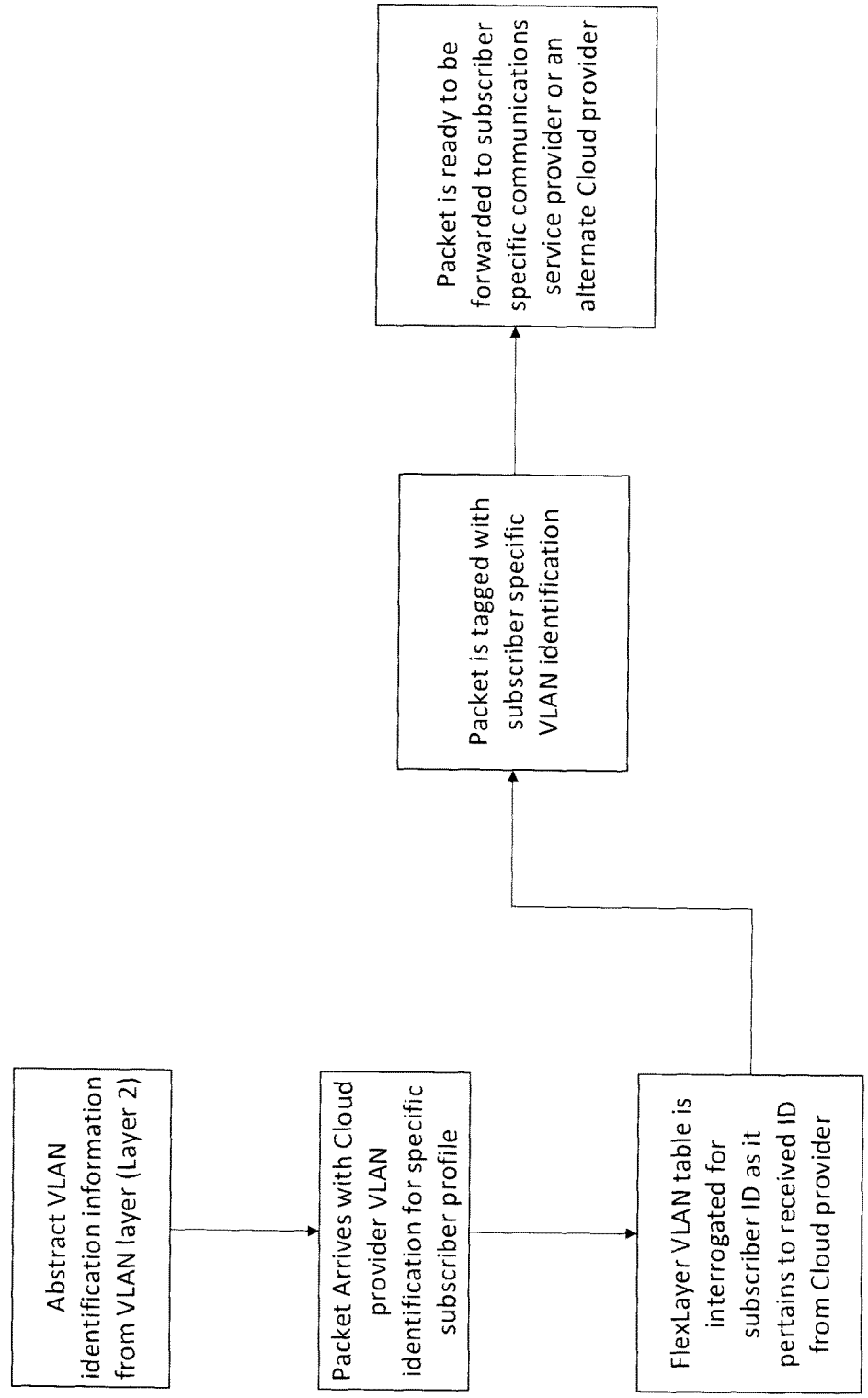

CLOUD NETWORK SERVICES PROVIDER HAVING A GATEWAY FOR SUBSCRIBER SPECIFIED CONNECTION TO A CLOUD SERVICE PROVIDER

BACKGROUND OF THE INVENTION

Field of the Invention

This invention relates to the system and methods for enabling subscriber connection to a cloud network service provider, independent of the subscriber's communication connection (internet service provider) preferences and/or restrictions for cloud computing services. Traditionally subscribers, individually or as a company, must currently use the cloud provider connection options to connect directly to cloud services over Layer 2 and Layer 3 protocols for communication over private networks. This invention provides a system which includes a Gateway for subscriber access to cloud computing services by means of modification of Routing and Switching manipulation of Layer 2 and Layer 3 protocols (also "FlexLayer") within the Gateway. The reference tables within the Gateway are initially populated, by means of a cloud service subscriber registration process, wherein a subscriber for cloud computing services initially creates a subscriber profile (containing unique subscriber information), and subscriber cloud preferences (designation or specification of one of more Cloud Service Providers). The registered subscriber can thereafter connect directly to a specified Cloud Service Provider of his own choosing, without regard for the subscriber specified communication connection preferences, and/or the embedded network infrastructure preferences, by adaptation of a subscriber communication message within the gateway of the FlexLayer, to comport with the communication protocol of a subscriber specified Cloud Service Provider.

Description of the Prior Art

The subscriber access to cloud computing service is generally network infrastructure specific, where such infrastructure imparts a characteristic identifiers, or tag, to a subscriber communication request for cloud computing services. These characteristic identifiers, or tags, associates the subscriber communication request, as having originated from an infrastructure specific carrier/source. Cloud network service providers also have a comparable virtual infrastructure specific identifier or tag; and consequently are only capable of connection with a subscriber having a compatible virtual infrastructure identifier or tag. Thus, the subscriber is limited to his choice of Cloud computing services by the virtual implementation of his connection, of his internet service provider, to the Cloud. Such inherent limitations in a subscriber request are well-known; and, notwithstanding have and continue to limit subscriber choices and undesirable bundling of Cloud computing services with the services of internet service providers.

Cloud computing services are best exemplified by the Amazon WebServices (AWS) or Google AppEngine. Both of these systems exhibit characteristics which are typical of such Cloud computing services, including, specifically, a virtual implementation of an underlying physical infrastructure which the subscriber never sees, *Blueprint for the Intercloud—Protocols and Formats for Cloud Computing Interoperability*, Bernstein, David et al, 2009 4th International Conference of Internet & Web Applications and Services.

U.S. Pat. No. 9,003,006 (to Xia et al. issued Apr. 7, 2015) fully appreciates this limitation of subscriber choice of Cloud service provider. The Xia et al. patent purports to resolve the limitation on subscriber choice of Cloud computing services by the providing a common interface on a series of subscriber computers within an enterprise, which initially permits each subscriber to execute an application to connect to a different cloud computing service, and thereby migrate through a private network, within the enterprise, from one cloud computing service to another. This is exemplified by Xia et al. by in FIGS. 3 & 4 of his patent. This patent is concentrated on the applications which exist across multiple cloud providers and describes a software layer to be installed between the Virtual Machine and the client computer. This software layer provides the tunneling capability to bypass traditional communications protocols and provide for cloud traversal specific to the application for which it is designed. In the implementation of this invention it is understood that software must be installed in the Virtual Machine of each cloud provider to enable this cloud traversal of the specific application being enabled. Thus, the limitation of the invention is dependent on a software layer for each independent cloud provider and client device; accordingly does not provide for enterprise access to the full menu of infrastructure services available on a cloud service provider, through the subscriber communication method of choice.

Accordingly, there continues to exist a need to afford a subscriber of cloud computing services the ability to choose, independent of this internet service provider, a cloud computing service which best suits his needs and financial means; and, switch from cloud computing service to another without having to change his internet services provider.

Objectives of this Invention

It is the object of this invention to remedy the above, as well as related deficiencies, in the prior art.

More specifically, it is the principle object of this invention to provide a proprietary Gateway for subscriber access to cloud computing services and by Routing and Switching manipulation of Layer 2 and Layer 3 protocols (also "FlexLayer") within the Gateway.

It is another object of this invention to provide a proprietary Gateway for subscriber access to cloud computing services and by Routing and Switching manipulation of Layer 2 and Layer 3 protocols (also "FlexLayer"), for abstraction, modification and reassembly of a subscriber communication message (also "Data Packet"), for transmission to a subscriber specified Cloud Service Provider.

It is yet another object of this invention to provide a proprietary Gateway for subscriber access to cloud computing services and by Routing and Switching manipulation of Layer 2 and Layer 3 protocols (also "FlexLayer"), for abstraction, modification and reassembly of a subscriber communication message (also "Data Packet"), wherein each of the Network Address and VLAN Layers are subjected to one or more sub-processes, to effect (a) modification of the routing address of the Network Address and (b) VLAN assignment the VLAN Layer, to comport with a VLAN assignment to a subscriber specified Cloud Service Provider, preliminary to transmission to a specified Cloud Service Provider.

It is still yet another object of this invention to provide a proprietary Gateway for subscriber access to cloud computing services and by Routing and Switching manipulation of Layer 2 and Layer 3 protocols (also "FlexLayer"), for abstraction of source and destination information from the Network Address layer, from a global routing table for source and destination networks, for a subscriber specified a Cloud Service Provider, for transmission to such subscriber specified a Cloud Service Provider.

Additional objects of this invention include a method for the connection of a subscriber to a cloud network services provider of the subscriber's own choosing and system for implementing such connection with the proprietary Gateway of this invention.

SUMMARY OF THE INVENTION

This invention utilizes systems and methods, (e.g. information processing with software, firmware and/or hardware, for manipulation and modification of routing and switching information in a communication message (or data packet), to allow subscribers to select any communication service provider, and attach/connect to virtually any cloud provider, by "translating" a series of communication service provider specific data communications protocols, and thereby adapting said data communications protocols, for connecting to cloud service provider specific data communications protocols, of the subscriber's choosing. Subscribers can, thus, maintain their existing, unique computer address identifiers in multiple cloud service providers. Subscribers can also migrate between cloud service providers or communications providers while maintaining their existing, customer specific, network configurations.

More specifically, this invention is accomplish by the provision of a proprietary Gateway, and by Routing and Switching manipulation of Layer 2 and Layer 3 protocols (also "FlexLayer"), for abstraction, modification and reassembly of a subscriber communication message (also "Data Packet"), for transmission to a subscriber specified Cloud Service Provider, based upon a registered subscriber personal profile and a registered subscriber preference for a specific Cloud Service Provider. This process of abstraction, modification and reassembly of the communication message (also collectively "translating" or "translation" or "adaptation" of the communication message), effects (a) modification of the routing address of the subscriber Network Address and (b) subscriber VLAN assignment of the VLAN Layer, so as to comport with a VLAN assignment to a subscriber specified Cloud Service Provider, preliminary to transmission to a specified Cloud Service Provider.

The FlexLayer translation of source and destination information from the Network Address layer, from a global routing table, for source and destination networks for a subscriber specified Cloud Service Provider, also modifies the VLAN identification for the Cloud Service Provider, with a subscriber specific VLAN identifier or tag, preliminary to transmission of the subscriber communication message to the subscriber specified Cloud Service Provider.

BRIEF DESCRIPTION OF THE DRAWINGS

FIG. 7 further illustrates, in greater detail, the abstraction of the subscriber data communication message of FIG. 6, by the FlexLayer of the Cloud Service Network Provider, wherein the Network Layer is abstracted, modified and reassembled, and thereby the virtual infrastructure specific identifier (designated by the subscriber communication provider), for Cloud Service Provider changed or adapted to comport to a subscriber specific source and destination identifier on a Cloud Service Network Provider routing table.

FIG. 8 further illustrates, in greater detail, the abstraction of the subscriber data communication message of FIGS. 6 & 7, by the FlexLayer of the Cloud Service Network Provider, wherein, the Network Layer is abstracted, modified and reassembled, and thereby the virtual infrastructure specific identifier (designated by the subscriber communication provider), for a communication service provider, is changed or adapted to comport to a subscriber specific communication service provider destination on a Cloud Service Network Provider routing table.

FIG. 9 further illustrates, in greater detail, the abstraction of the subscriber data communication message of FIG. 6, by the FlexLayer of the Cloud Service Network Provider of FIG. 6, wherein, the VLAN Layer is abstracted, modified and reassembled and the data packet from the registered subscriber mapped from the customer specific VLAN to the Cloud Service Provider VLAN, by replacing the VLAN identification data packet (tagging) with the subscriber specific VLAN identification.

FIG. 10 further illustrates, in greater detail, the abstraction of the subscriber data communication message of FIGS. 6 & 9, by the FlexLayer of the Cloud Service Network Provider, wherein, the VLAN Layer is abstracted, modified and reassembled, by the FlexLayer of the Cloud Service Network Provider, to alter the subscriber VLAN assignment, by application of a tag for a subscriber specific VLAN identification, and thereby modify the data packet with the subscriber Cloud Service Provider preferences.

DESCRIPTION OF THE INVENTION INCLUDING PREFERRED EMBODIMENTS

Figure 1:
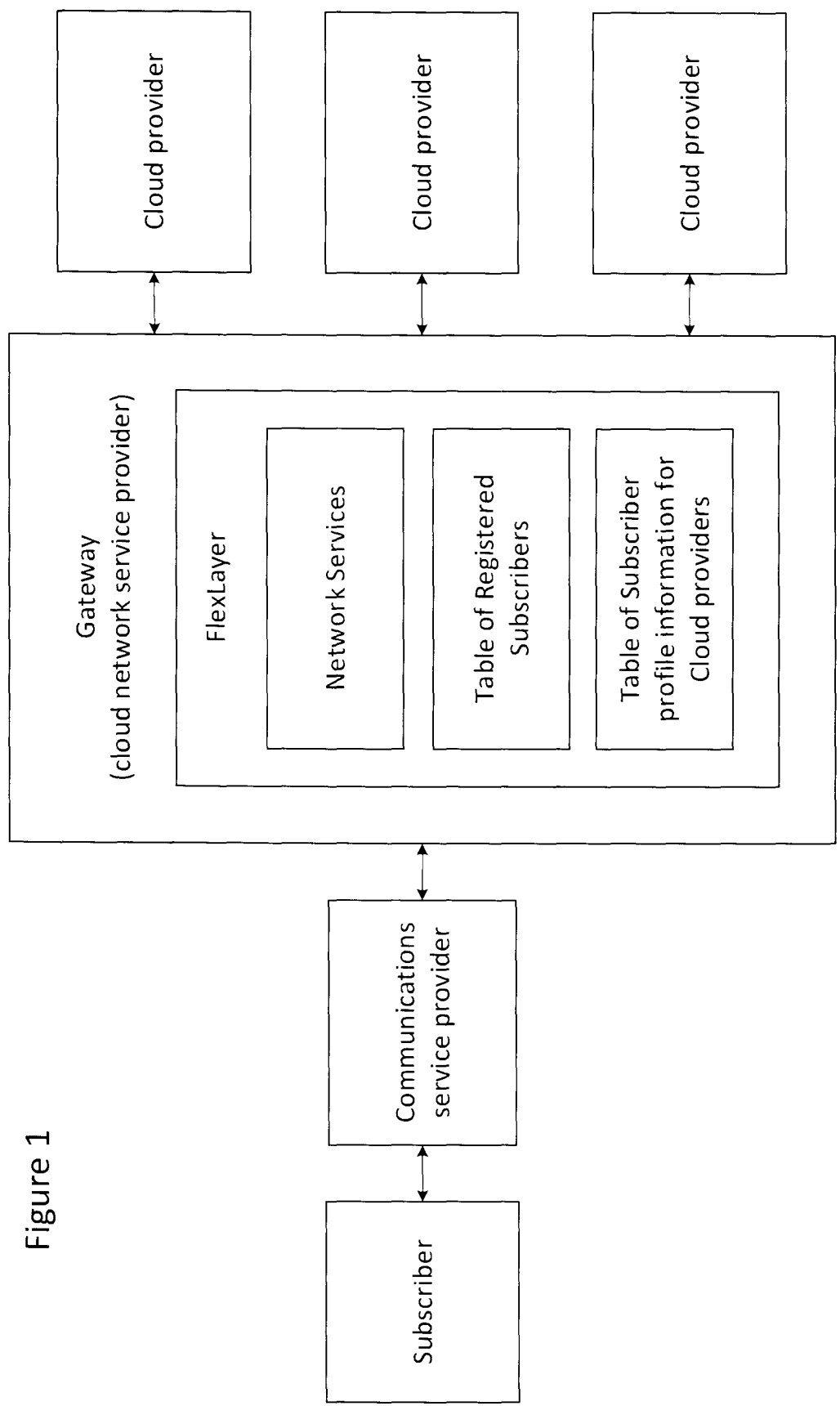
FIG. 1 illustrates a representative Cloud Service Network Provider, wherein a subscriber can register its personal communication profile and cloud service provider preferences, for later access a to subscriber specified Cloud Service Provider of his own choosing.

As understood within the context of this invention, the following terms and phrases are intended to have the following meaning unless otherwise indicated.

Glossary of Terms

The term "Gateway" is intended, and used herein, to describe, in a communications network, a network node equipped for interfacing with another network that uses different protocols.

The phrase "IaaS" is intended, and used herein, to describe Infrastructure as a Service (IaaS) is a form of cloud computing that provides virtualized computing resources over the Internet.

The phrase "SaaS" is intended, and used herein, to describe Software as a Service (SaaS; pronounced /sæs/ or /sa:s/), which is a software licensing and delivery model in which software is licensed on a subscription basis and is centrally hosted. It is sometimes referred to as "on-demand software". SaaS is typically accessed by users using a thin client via a web browser.

The phrase "PaaS" is intended, and used herein, to describe Platform as a Service (PaaS), which is a category of cloud computing services that provides a platform allowing customers to develop, run and manage Web applications without the complexity of building and maintaining the infrastructure typically associated with developing and launching an app.

The phrase "Cloud Provider Service" is intended, and used herein, to describe a company that offers some component of cloud computing—typically Infrastructure as a Service (IaaS), Software as a Service (SaaS) or Platform as a Service (PaaS)—to other businesses or individuals.

The phrase "Communications Service Provider" is intended, and used herein, to describe a company that transports information electronically. The phrase encompasses public and private companies in the telecom (landline and wireless), Internet, cable, satellite, and managed services businesses.

The phrase "Internet Service Provider" or "ISP" is intended, and used herein, to describe a company that provides services for accessing, using, or participating in the Internet.

The phrase "Cloud Subscriber" or "Subscriber" is intended, and used herein, to describe an end user or organization who consumes IaaS, SaaS and PaaS through Cloud Providers.

The phrase "Network Services" is intended to mean a service or feature which is offered by 3$^{rd}$ party manufacturers to encrypt, accelerate/compress, load balance, and other comparable enhancements to network communications. These hardware and software services or features are offered from companies such as Cisco, Citrix, Riverbed and F5.

The phrase "Local Area Network" or "LAN" is intended, and used herein, to describe a computer network that interconnects computers within a limited area such as a home, school, computer laboratory, or office building, using network media.

The term "Abstract", "Abstraction" and/or "Abstraction Process" is intended, and used herein, to describe a computer implemented method or process for the separation or parsing of a communication message into distinct layers, specifically, into three (3) distinct layers, a Network Address (also "Layer 3"), VLAN layer (also "Layer 2") and a Data Layer (also "Layer 1"). This term/phrase can be inclusive of the further modification and reassembly of the layers into a communication message having subscriber and/or cloud provider specific routing and VLAN identification.

The phrase "Layer 2" is intended, and used herein, to describe the Data Link layer of the commonly-referenced multilayered communication model, Open Systems Interconnection (OSI). The Data Link layer is concerned with moving data across the physical links in the network. Layer 2 enables communication across the same segment of network, commonly referred to as LAN.

The phrase "Layer 3" is intended, and used herein, to describe the Data Link layer concerned with moving data across the physical links in the network. Layer 3 refers to the Network layer of the commonly-referenced multilayered communication model, Open Systems Interconnection (OSI). Layer 3 enables communication across segments of networks, it is responsible for enabling technologies like VPN and WAN.

The phrase "MAC Address" is intended, and used herein, to describe a media access control address (MAC address) and is a unique identifier assigned to network interfaces for communications on the physical network segment. MAC addresses are used as a network address for most IEEE 802 network technologies, including Ethernet and WiFi. A MAC address is required to communicate over Layer 2.

The phrase "Virtual Local Area Network" or "VLAN" is intended, and used herein, to describe a group of devices on one or more LANs that are configured to communicate as if they were attached to the same wire, when in fact they are located on a number of different LAN segments. Because VLANs are based on logical instead of physical connections, they are extremely flexible.

The phrase "IP Address" is intended, and used herein, to describe a unique string of numbers separated by periods that identifies each computer using the Internet Protocol to communicate over a network. An IP address is required to communicate over Layer 3.

The phrase "Data Packet" or "Packet" is intended, and used herein, to describe a basic unit of communication over a digital network. A Packet is also called a datagram, a segment, a block, a cell or a frame, depending on the protocol. When data has to be transmitted, it is broken down into similar structures of data, which are reassembled to the original data chunk once they reach their destination.

The phrase "Communication Management Platform" or "CMP" is intended, and used herein, to describe a an application and subprocess for the communication management of Layer 2 and Layer 3 protocols which translates/modifies these layers to enable a Cloud Subscriber to specify Cloud Provider independent of a virtual infrastructure specific identifier or tag of his Communications Service Provider.

The description which follows presents, in narrative form, a description of the flow charts which accompany the filing of this invention.

FIG. 1 depicts a simplified illustration of the overall functional and interactive components of the system of this invention. In FIG. 1, a subscriber initially enrolls in the Cloud Network Services Provider (also CNSP) of this invention, preferably, by access to such Provider on an internet connection. This enrollment process contemplates the subscriber populate certain data fields within the Cloud Network Services Provider data bases to establish a unique subscriber specific profile. At a minimum this subscriber specific profile includes identification of the subscriber and/or the entity (enterprise), its physical address, its communication service provider (over which it gains access to internet accessible services), any optional Network Services feature, its Cloud Service Provider preferences, and/or the services it desires to access from a Cloud Services Provider. The Cloud Network Services Provider uses the subscriber enrollment information to create a table of registered subscribers and subscriber profile information (preferences) for Cloud Service Providers.

Figure 2:
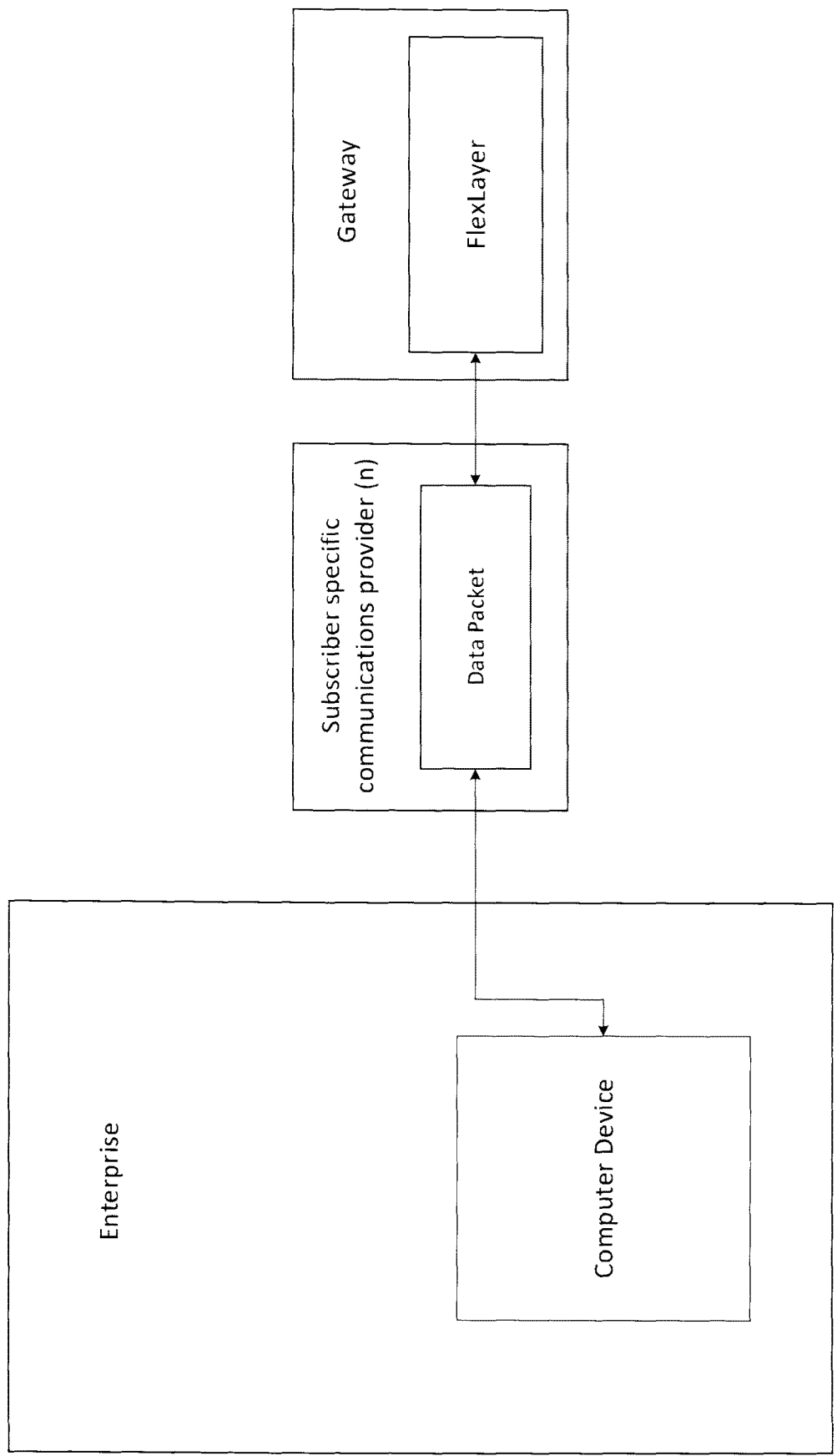
FIG. 2 illustrates a transmission of communication message (data packet) from a computer of a registered subscriber, through a subscriber specified communication provider (network connection), to the Cloud Service Network Provider of this invention.

FIG. 2 further expands upon the interaction and operation of the functional and interactive components of the system of this invention depicted in FIG. 1. In FIG. 2 an enterprise, or a member of the enterprise, which is a registered subscriber to the Cloud Network Services Provider, sends an electronic communication message (date packet) through an internet connection on the subscriber specific communication provider to the Cloud Network Services Provider of this invention. As above noted, Cloud network service providers also have a virtual infrastructure specific identifier or tag; and consequently are only capable of connection with a subscriber having a compatible virtual infrastructure identifier or tag. These virtual infrastructure specific identifier or tag, associate, the subscriber communication message, thus, identifies such subscriber communication message as having originated from a specific carrier/source. Accordingly, Enterprise communication message includes a communication services provider preference of for a specific Cloud Services Provider, which has been intentionally bundled with the communication services provider.

Figure 3:
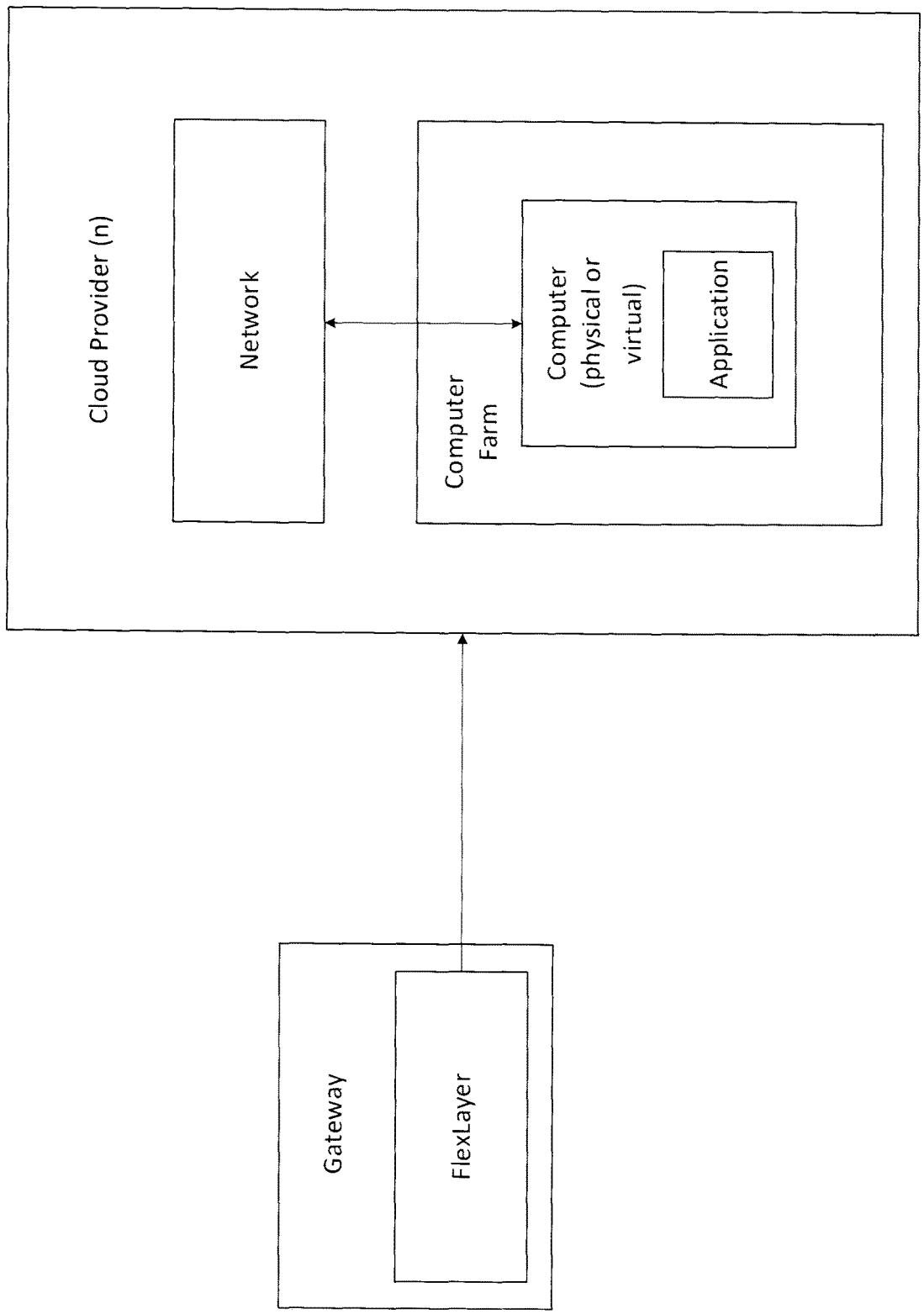
FIG. 3 illustrates the interaction of the Cloud Service Network Provider of FIG. 2 with one or more subscriber specified Cloud Service Provider(s), and subscriber access to a subscriber specified Cloud Service Provider, through the Cloud Service Network Provider of this invention.

FIG. 3 further expands upon the interaction and operation of the functional and interactive components of the system of this invention depicted in FIG. 1. In FIG. 3, the Cloud Network Services Provider and Cloud Service Provider are in electronic communication with one another. In this illustration, it is assumed the Cloud Service Provider has been specified by at least one of the subscribers to the Cloud Network Services Provider. This electronic access to Cloud Service Provider, and the communication there between, permits the attainment and capture the Cloud Service Provider network communication protocol, specifically its VLAN signature/identifier. As more fully described in FIG. 10, the Cloud Service Provider VLAN signature/identifier is subject to abstraction and modification, wherein a tag is applied thereto to render such Cloud Service Provider accessible to any one of the registered subscribers of the Cloud Network Services Provider, without regard to the subscriber specified communication service preferences for a Cloud Service Provider.

Figure 4:
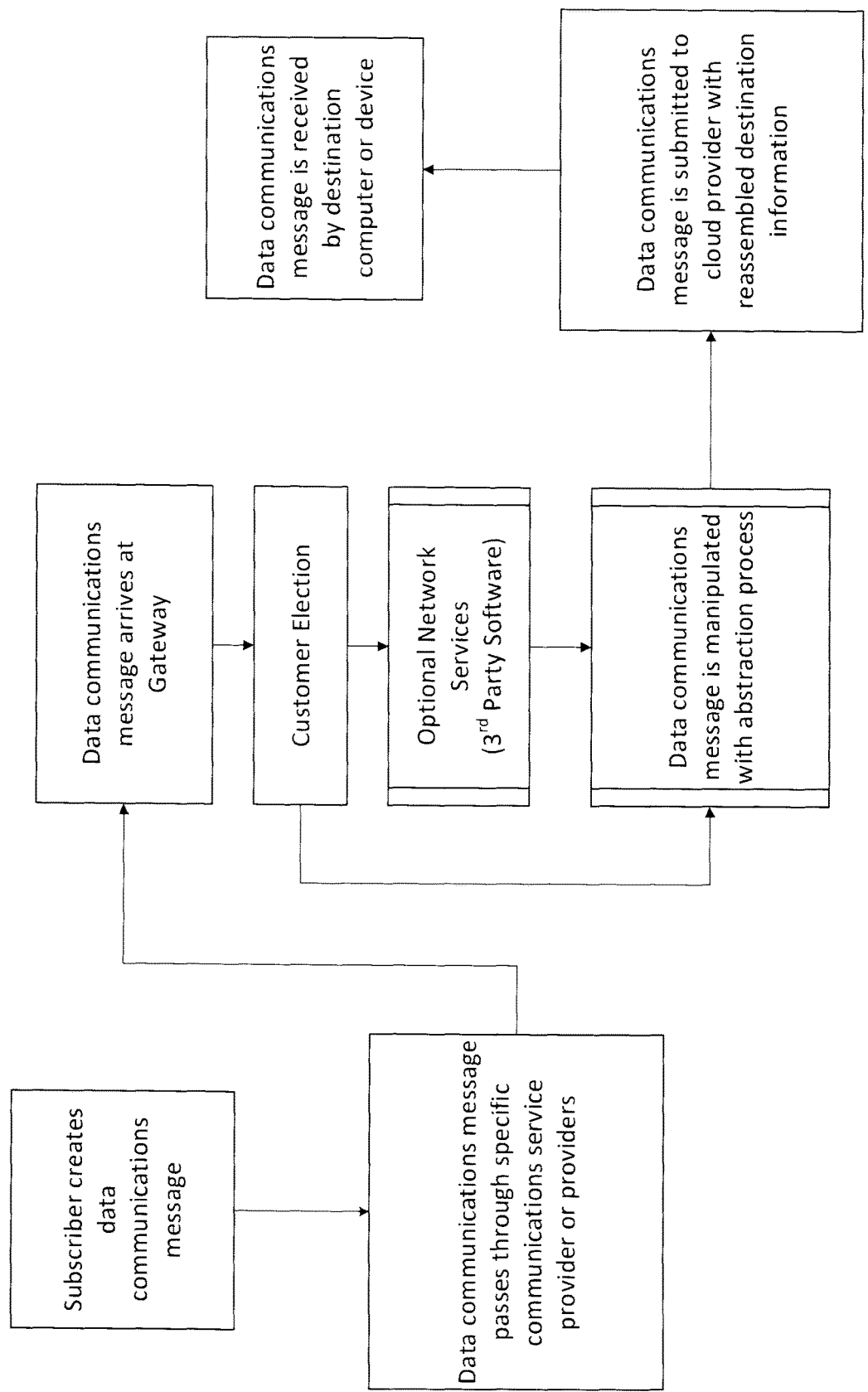
FIG. 4 illustrates the translation or adaptation of the subscriber communication message, (data packet), by the Routing and Switching System (also "FlexLayer") of the Cloud Service Network Provider of FIG. 3, wherein the data packet is abstracted, modified and reassembled prior to transmission to a subscriber specified Cloud Service Provider.

FIG. 4 further expands upon the interaction and operation of the functional and interactive components of the system of this invention depicted in FIG. 1. In FIG. 4, a registered subscriber creates a data communication message, (data packet) and transmits the data communication message, through the subscriber specified communication service, to Cloud Service Network Provider. The data communication message, once received by the Cloud Service Network Provider, is subjected to an optional Customer Elected Network Service feature(s) and an Abstraction Process.

The Customer Elected Network Services feature(s) are designed by 3$^{rd}$ party technology providers to enhance standard network communication. Features such as encryption, compression and load balancing are examples of these enhancements and can be applied to the data communications messages prior to the Abstraction Process, if the customer elects these services. Once this process is completed, the data communications message is submitted to the Abstraction Process. The Abstraction Process ensues, wherein the data packet is abstracted, modified and reassembled prior to transmission to a subscriber specified Cloud Service Provider. As more fully discussed in the description of FIG. 6, the Abstraction Process causes the data communication message to be separated/parse into individual layers for modification and reassembly, as appropriate, to facilitate the registered subscriber connection to the Cloud Service Provided, which it has specified in its Cloud Service Provider preferences of its profile.

Figure 5:
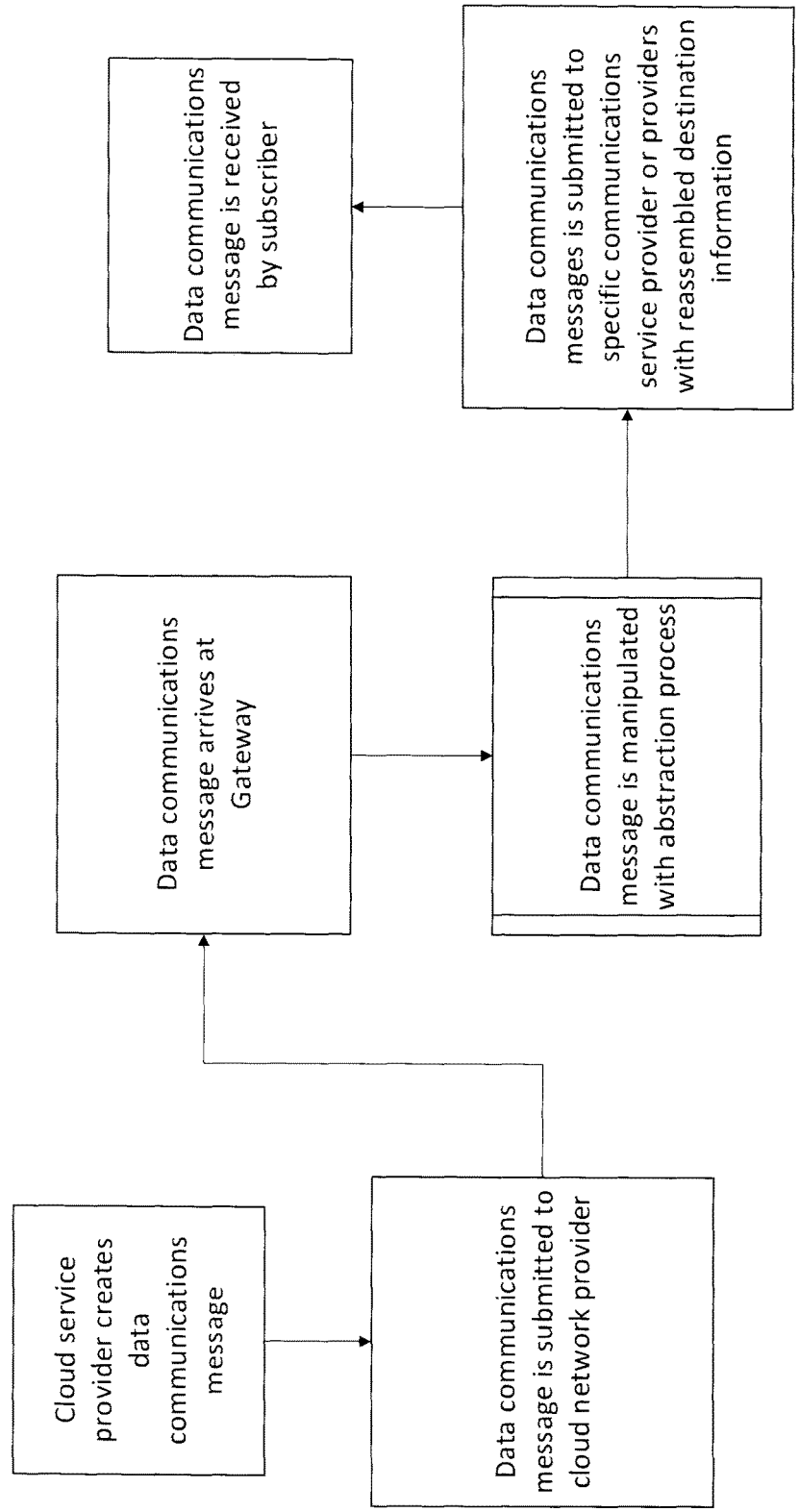
FIG. 5 illustrates the translation or adaptation of the Cloud Service Provider communication message by the Cloud Service Network Provider of FIG. 3, by the FlexLayer of the Cloud Service Network Provider, wherein the Cloud Service Provider communication message is abstracted, modified and reassembled by the Routing and Switching System (also "FlexLayer") of the Cloud Service Network Provider of FIG. 3 prior to transmission to a subscriber of the Cloud Service Network Provider.

FIG. 5 further expands upon the interaction and operation of the functional and interactive components of the system of this invention depicted in FIGS. 1 & 3. In FIG. 5, a Cloud Service Provider data communication message is transmitted to the Cloud Service Network Provider of FIG. 3. This Cloud Service Provider data communication message is manipulated by an Abstraction Process within the FlexLayer of the Cloud Service Network Provider, wherein this Cloud Service Provider data communication message (VLAN identification data packet), is modified by replacing the VLAN identification data packet (tagging) with the subscriber specific VLAN identification tag. This process of abstraction and modification of the Cloud Service Provider data communication message (VLAN identification data packet), is more fully described in reference to FIG. 8.

Figure 6:
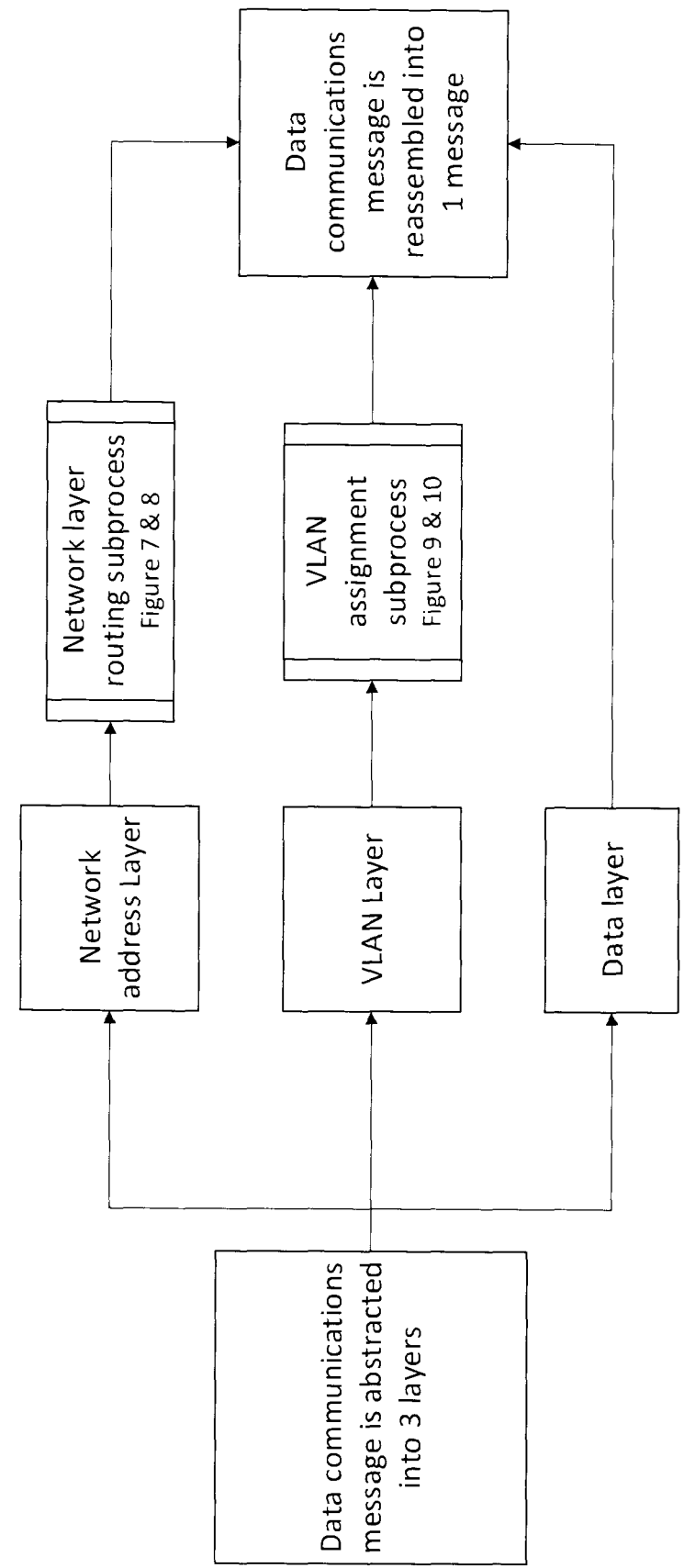
FIG. 6 further illustrates, in greater detail, the abstraction of the subscriber data communication message of FIG. 4, by the Routing and Switching System (also "FlexLayer") of the Cloud Service Network Provider of FIG. 4, wherein the data communication message, is separated/parsed by the FlexLayer into three (3) distinct layers, and each of the Network and VLAN layers subjected to Layer specific sub-processes, modified and reassembled.

FIG. 6 further expands upon the interaction and operation of the functional and interactive components of the system of this invention depicted in FIGS. 1 & 4. In FIG. 6, the registered subscriber communication message (data packet) is initially transmitted to the Cloud Service Network Provider as depicted in FIG. 4. This communication message (data packet) is subjected by an Abstraction Process, wherein the data packet is separated/parsed by the FlexLayer into three (3) distinct layers, and each of the Network Address Layer and VLAN Layer is subjected to layer specific sub-processes, modified and reassembled. This abstraction, modification of the Network Address Layer (Layer 3) and the VLAN Layer (Layer 2), and the further processing/modification thereof, effects changes in the routing and VLAN identification of the data packet, to comport with registered subscriber preference for a specific Cloud Service Provider. This Abstraction Processing and modification of Network Address Layer (Layer 3) is more fully described in reference to FIG. 7.

FIG. 7 further expands upon the interaction and operation of the functional and interactive components of the system of this invention depicted in FIGS. 1, 4 & 6. In FIG. 7, the Network Layer routing sub-processes abstracts the destination address information of the data packet of the Network Address layer (Layer 3) and queries a global routing table for source and destination networks. The data packet, containing the abstracted destination address information, is placed on a subscriber specific, Cloud Network Services Provider routing table, which queries a subscriber specific routing table for a Cloud Services Provider destination. The data packet, with the subscriber specified Cloud Service Provider destination, is forwarded to the specific Cloud Service Provider.

FIG. 8 further expands upon the interaction and operation of the functional and interactive components of the system of this invention depicted in FIGS. 1, 4, 6 & 7. In FIG. 8, the Network Layer routing sub-processes abstract the destination address information of the data packet of the Network Address layer (Layer 3) and queries a global routing table for source and destination networks. The data packet, containing the abstracted destination address information, is placed on a subscriber specific, Cloud Network Services Provider routing table, for communication service provider information. The registered subscriber specified communication service provider information preference for a Cloud Service Provider is modified within Network Address layer (Layer 3), and, the data packet reassembled with a specific communication service provider address, which is unique to the registered subscriber.

FIG. 9 further expands upon the interaction and operation of the functional and interactive components of the system of this invention depicted in FIGS. 1, 5 & 8. In FIG. 9, the VLAN assignment sub-processes abstract the identification information of the VLAN Layer (Layer 2) of the data packet, and queries a VLAN table for subscriber specific VLAN identification information. The data packet is thereupon tagged with a subscriber specific VLAN identifier, and the subjected to further processing by FlexLayer manipulation and modification of routing and switching information, within the Cloud Network Services Provider, wherein the data packet is mapped by replacing the identification tag of the subscriber specific VLAN to a Cloud Services Provider VLAN identification tag.

FIG. 10 further expands upon the interaction and operation of the functional and interactive components of the system of this invention depicted in FIGS. 1, 5, 8 & 9. In FIG. 10, the VLAN assignment sub-processes abstracts registered subscriber specific VLAN identification of the data packet, for the VLAN identification associated with a registered subscriber profile, and interrogates the registered subscriber profile for a Cloud Service Provider VLAN identifier of his own choosing. The data packet is then tagged with the VLAN identifier specified by the registered subscriber, and the data packet forwarded to the subscriber specified communication service provider or to Cloud Service Provider.

The foregoing system and method have exemplified and described by reference to number of the preferred embodiments of this invention. It is appreciated that improvements thereto and technical advances in both communication systems and the methods for delivery of cloud computing services have and continue to change, for example, by combining multiple functional steps and/or by the elimination of a component of a communication services, to effect the same or substantially the objectives as depicted in the preferred embodiments described above. Accordingly, it is not the intention nor the purpose of the description to delineate the scope of this invention, which is set forth in the claims that follow.

What is claimed is:

1. A cloud service network provider having a system for connecting a subscriber to a cloud service provider through a subscriber communication service having embedded network infrastructure preferences associated with a specific communication services provider, said system comprising:
 a gateway for connecting a subscriber communication input device, through a subscriber communication service, to an accessible cloud service provider, wherein the gateway includes:
  a module for registration of a cloud service subscriber; and
  a module for creation of a cloud service subscriber profile having cloud service subscriber identifying information, cloud service subscriber location information and cloud service subscriber specified preferences for a cloud service provider;
 means for cloud service subscriber generation of a communication message (data packet) for transmission to a cloud services provider through said gateway, said communication message having a subscriber Network Address comprising at least Layer 1, Layer 2, and Layer 3 protocols, and a Virtual Local Area Network ("VLAN"); and
 a communication management platform for manipulating said Layer 2 and said Layer 3 protocols of said subscriber Network Address by abstraction, modification, and reassembly of said Layer 2 and Layer 3 of said Network Address of said communication message, to effect modification of the routing address of the subscriber Network Address and subscriber VLAN assignment of the VLAN layer by routing and switching manipulation of Layer 2 and Layer 3 protocols for abstraction of source and destination information from the Network Address, from a global routing table for source and destination networks, for a subscriber specified cloud service provider, and for transmission to such subscriber specified cloud service provider, to comport with a VLAN assignment to a subscriber specified Cloud Service Provider, preliminary to transmission to said subscriber specified Cloud Service Provider.

2. The cloud service network provider of claim 1 wherein said subscriber generation of a communication message (data packet) includes one or more subscriber Elected Network Services for enhancement of network communication.

3. A system for connecting a subscriber to a cloud service provider through a subscriber communication service having embedded network infrastructure preferences associated with a specific communication services provider comprising:
 a gateway for connecting a subscriber communication input device, through the subscriber communication service, to an accessible cloud service provider, wherein the gateway includes:
  a module for registration of a cloud service subscriber;
  a module for creation of a cloud service subscriber profile, said profile having cloud service subscriber identifying information, cloud service subscriber location information, and cloud service subscriber specified preferences for a cloud service provider;
 means for cloud service subscriber generation of a communication message (data packet) for transmission to the cloud services provider through said gateway, said communication message having a subscriber Network Address, comprising at least Layer 1, Layer 2, and Layer 3 protocols, and a Virtual Local Area network ("VLAN"); and
 a communication management platform for manipulating said Layer 2 and said Layer 3 protocols of said subscriber specific Network Address by abstraction, modification and reassembly of said Layer 2 and Layer 3 of said Network Address of said communication message, to effect modification of the routing address of the subscriber Network Address and subscriber VLAN assignment of the VLAN Layer, to comport with a VLAN assignment to a subscriber specified cloud service provider, preliminary to transmission to said subscriber specified cloud service provider;
 wherein said communication management platform effects translation or modification of the Network Address of said communication message (data packet), by routing and switching manipulation of Layer 2 and Layer 3 protocols for abstraction of source and destination information from the Network Address, from a global routing table for source and destination networks, for a subscriber specified cloud service provider, for transmission to such subscriber specified cloud service provider.

4. The system of claim 3 wherein said subscriber generation of the communication message (data packet) includes one or more subscriber elected network services for enhancement of network communication.

5. An improved method for connecting a subscriber to a cloud service provider through a subscriber communication service having embedded network infrastructure preferences associated with a specific communications services provider, wherein the improvement comprises:

providing a cloud service network provider having a system for connecting the subscriber to the cloud service provider through a subscriber communication service having embedded network infrastructure preferences associated with the specific communication services provider including:

a gateway for connecting a subscriber communication input device, through a subscriber communication service, to an accessible cloud service provider, wherein the gateway includes a module for registration of a cloud service subscriber and a module for creation of a cloud service subscriber profile having cloud service subscriber identifying information, cloud service subscriber location information, and cloud service subscriber specified preferences for a cloud service provider;

means for cloud service subscriber generation of a subscriber communication message (data packet) for transmission to a cloud services provider through said gateway, said communication message having a subscriber specific Network Address, comprising at least Layer 1, Layer 2, and Layer 3 protocols, and a Virtual Local Area Network ("VLAN");

a communication management platform for manipulating said Layer 2 and said Layer 3 protocols of said subscriber specific Network Address, by abstraction, modification, and reassembly of said Layer 2 and said Layer 3 of said Network Address of said communication message, to effect modification of the routing address of the subscriber Network Address and subscriber VLAN assignment of the VLAN layer, to comport with a VLAN assignment to a subscriber specified cloud service provider, preliminary to transmission to a said subscriber specified cloud service provider;

providing an accessible cloud service provider; and initiating of a subscriber communication message (data packet) through said gateway for transmission to a subscriber specified cloud service provider;

wherein said communication management platform effects translation or modification of the Network Address of said communication message (data packet), by routing and switching manipulation of Layer 2 and Layer 3 protocols for abstraction of source and destination information from the Network Address, from a global routing table for source and destination networks, for a subscriber specified cloud service provider, for transmission to such subscriber specified cloud service provider.

6. The method of claim 5 wherein said subscriber generation of a communication message (data packet) includes one or more subscriber elected network services for enhancement of network communication.

7. A communication management platform, within a gateway, comprising an application and sub-processes for translating or modifying a Network Address, comprising at least Layer 1, Layer 2, and Layer 3 protocols, of a subscriber communication message (data packet), and thereby manipulating said Layer 2 and said Layer 3 protocols of said subscriber specific Network Address, by abstraction, modification and reassembly of said Layer 2 and Layer 3 of said Network Address of said communication message, to effect modification of the routing address of the subscriber Network Address and subscriber Virtual Local Area Network ("VLAN") assignment of the VLAN layer, to comport with VLAN assignment to a subscriber specified cloud service provider, preliminary to transmission to said subscriber selected cloud service provider wherein said communication management platform effects translation or modification of the Network Address of said communication message (data packet), by routing and switching manipulation of Layer 2 and Layer 3 protocols for abstraction of source and destination information from the Network Address, from a global routing table for source and destination networks, for a subscriber specified cloud service provider, for transmission to such subscriber specified cloud service provider.

8. The communication management platform of claim 7 wherein said subscriber communication message (data packet) includes one or more subscriber elected network services for enhancement of network communication.

* * * * *